(12) United States Patent
Razouki

(10) Patent No.: US 12,539,079 B2
(45) Date of Patent: *Feb. 3, 2026

(54) HANDS FREE HEART-BEAT AUDIO TRANSMITTER AND RECEIVER SYSTEM

(71) Applicant: Crystal Razouki, La Mesa, CA (US)

(72) Inventor: Crystal Razouki, La Mesa, CA (US)

( * ) Notice: Subject to any disclaimer, the term of this patent is extended or adjusted under 35 U.S.C. 154(b) by 680 days.

This patent is subject to a terminal disclaimer.

(21) Appl. No.: 17/893,121

(22) Filed: Aug. 22, 2022

(65) Prior Publication Data

US 2023/0049966 A1 Feb. 16, 2023

Related U.S. Application Data

(63) Continuation-in-part of application No. 16/393,022, filed on Apr. 24, 2019, now Pat. No. 11,617,514.

(60) Provisional application No. 62/662,067, filed on Apr. 24, 2018.

(51) Int. Cl.
  *A61B 5/024* (2006.01)
  *A61B 5/00* (2006.01)
  *A61B 7/04* (2006.01)

(52) U.S. Cl.
  CPC .......... *A61B 5/486* (2013.01); *A61B 5/02438* (2013.01); *A61B 7/04* (2013.01)

(58) Field of Classification Search
  None
  See application file for complete search history.

(56) References Cited

U.S. PATENT DOCUMENTS

| 4,021,933 A | 5/1977 | Hughes |
| 4,850,023 A | 7/1989 | Yarush |
| 4,898,179 A | 2/1990 | Sirota |
| 5,314,389 A | 5/1994 | Dotan |
| 5,343,871 A * | 9/1994 | Bittman ................. A61B 5/486 600/545 |
| 5,807,268 A | 9/1998 | Reeves et al. |

(Continued)

OTHER PUBLICATIONS

DIGI-Key, Spark fun electronics—https://www.digikey.com/product-detail/en/sparkfun-electronics/ BOB-12758/1568-1472-ND/6592307? WT.srch=1 &gclid=CjOKCQjwzlzWBRDnARIsMkc8hHMsZ1 BMi9VEwb1 ELMOZI9qCL-hEM1NckX4SOJ1 igo46pac3-V28K4aAjgNEALw_wcB, pub. at least by Apr. 20, 2018.

(Continued)

*Primary Examiner* — Kennedy Schaetzle
(74) *Attorney, Agent, or Firm* — Procopio, Cory, Hargreaves & Savitch LLP

(57) ABSTRACT

A system and methods for a hands-free transmission, reception, and processing of a heartbeat audio is disclosed. In one embodiment, the system includes a heart monitor having a microphone, configured to pick-up a heartbeat sound wave and convert the heartbeat sound wave to a heartbeat audio, and a transmitter, configured to transmit the heartbeat audio; headphones having a receiver, configured to receive the heartbeat audio from the transmitter, and a speaker configured to play the heartbeat audio for a user; and a software application configured to (i) generate an overlaid audio by overlaying a secondary audio file onto the heartbeat audio, (ii) transmit the overlaid audio to the receiver, and (iii) play the overlaid audio using the speaker while the user is meditating, relaxing, or working out.

20 Claims, 4 Drawing Sheets

(56) References Cited

U.S. PATENT DOCUMENTS

| | | | |
|---|---|---|---|
| 6,212,427 B1 | 4/2001 | Hoover | |
| 8,388,512 B2* | 3/2013 | Brandes | A61M 21/00 |
| | | | 600/26 |
| 8,461,089 B2 | 6/2013 | Woo et al. | |
| D730,761 S | 6/2015 | Spaeth et al. | |
| 9,579,060 B1* | 2/2017 | Lisy | A61B 5/165 |
| 10,631,786 B2 | 4/2020 | Horii et al. | |
| 2005/0074130 A1 | 4/2005 | Brummel et al. | |
| 2005/0266961 A1* | 12/2005 | Shum | A63B 71/0622 |
| | | | 600/300 |
| 2007/0203421 A1* | 8/2007 | Cho | A61B 5/486 |
| | | | 600/519 |
| 2007/0299354 A1 | 12/2007 | Striepe et al. | |
| 2008/0013747 A1 | 1/2008 | Tran | |
| 2008/0114220 A1 | 5/2008 | Banet et al. | |
| 2008/0171945 A1 | 7/2008 | Dotter | |
| 2008/0214903 A1 | 9/2008 | Orbach | |
| 2009/0177097 A1 | 7/2009 | Ma et al. | |
| 2010/0069735 A1 | 3/2010 | Berkner | |
| 2010/0172522 A1* | 7/2010 | Mooring | H04R 1/1041 |
| | | | 381/103 |
| 2010/0240945 A1 | 9/2010 | Bikko | |
| 2013/0150754 A1 | 6/2013 | Rogers et al. | |
| 2013/0253334 A1 | 9/2013 | Al-Ali et al. | |
| 2014/0142403 A1 | 5/2014 | Brumback et al. | |
| 2014/0303531 A1 | 10/2014 | Katz et al. | |
| 2015/0057512 A1 | 2/2015 | Kapoor | |
| 2015/0164340 A1 | 6/2015 | Bedingham et al. | |
| 2017/0238812 A1 | 8/2017 | Atlas | |
| 2017/0333666 A1 | 11/2017 | Goldberg et al. | |
| 2017/0352283 A1* | 12/2017 | Lau | A61B 5/165 |
| 2018/0099115 A1* | 4/2018 | Connell, II | A61B 5/6893 |
| 2018/0325487 A1 | 11/2018 | Hoppmann et al. | |
| 2019/0030277 A1* | 1/2019 | Espi Maques | A61B 5/6815 |
| 2019/0247010 A1* | 8/2019 | Barnacka | A61B 8/02 |
| 2019/0298272 A1 | 10/2019 | Persen et al. | |
| 2019/0307983 A1* | 10/2019 | Goldman | A61B 5/165 |

OTHER PUBLICATIONS

Perafix, double sided tape, https://parafix.com/product-groups/double-sided-materials/double-sided-tape/published at east by Apr. 20, 2018.

Notice of Allowance for U.S. Appl. No. 16/393,022 dated Dec. 7, 2022, 7 pgs.

* cited by examiner

HANDS FREE HEART-BEAT AUDIO TRANSMITTER AND RECEIVER SYSTEM

RELATED APPLICATIONS

This application claims priority as continuation-in-part to U.S. application Ser. No. 16/393,022, entitled "Hands free heart-beat Audio Transmitter and Receiver System, Plus Related Methods of Exercise, Meditation and Relaxation", filed on Apr. 24, 2019, which claims the benefit and priority of U.S. Prov. App. Ser. No. 62/662,067 filed on Apr. 24, 2018 and titled "Hands free heart-beat audio transmitter and receiver system, plus related methods of exercise, meditation and relaxation." All of the above are incorporated by reference in their entirety as if set forth in full.

TECHNICAL FIELD

The embodiments described herein are generally directed to an audio transmitter and receiver system, and, more particularly, to a hands-free heartbeat audio transmitter and receiver system and related methods of exercise, meditation, and relaxation.

BACKGROUND

Field

The disclosed subject matter is in the field of apparatus and related methods of meditation, exercise and relaxation. Specifically, the disclosed subject matter is in the field of heart-beat audio transmitter and receiver systems, plus related methods of using the transmitters and receivers to accomplish meditation or relaxation. Additionally, the disclosed subject matter is in the field of software applications for recording a user's heart beat for a predetermined period of time and playing back portions of the recorded heartbeat that demonstrate increased heart rate variability (i.e., play back of a portion of the user's heart beat that was recorded while the user was relaxed).

Related Art

Heart sounds are the noises generated by the heart muscle and resulting flow of blood caused by its contractions and expansions. The sounds created are directly caused by turbulent blood fluid and contraction and expansion of the muscle opens and closes valves to produce blood flow throughout the body. The heart has two distinct sounds that are produced by the alternating operation of the atrioventricular and semilunar heart valves. The first sound is produced when the atrioventricular valves of the heart muscle are closed and the semilunar valves are open. The second sound is produced when the semilunar valves are closed and the atrioventricular valves are open. Doctors often listen closely to the sounds of a patient's heart via a stethoscope to determine whether the heart is operating normally or is otherwise healthy.

In addition to doctors, other third-parties listen to another's heart sounds in nonmedical situations because the sounds of a beating heart are known to provide benefits to such third-party listeners. For instance, mothers often hold their newborn babies against their chest and it is thought that the sounds of the mothers heart, albeit feinted and dampened by the mother's chest tissue, soothe the baby and contributes to the baby's brain development. In another instance, after infancy, adolescent and adult lovers are known to listen to one-another's' heart sounds through the chest tissue as a bonding or intimacy-promoting exercise. A stethoscope can be used to increase the volume of a heart sounds to a third-party listener, but the struggle of holding the stethoscope in place detracts from the soothing or intimate nature of sounds. So, stethoscopes are not preferred by babies or lovers listening to heart sounds.

Monitoring your own heart beat is also beneficial. Heart rate monitors are worn by exercisers to ensure that their heart rate is within a desired range for weight loss. Individuals also often self-diagnose ailments by monitoring their heart rate. Finally, many methods of relaxation or meditation involve controlled breathing and heart rate monitoring to keep the heart rate to a preferred range. However, these heart monitoring techniques have not yet included the soothing and intimacy promoting benefits of listing to heart sounds. Many heart monitors detect the electrical pulses generated by a beating heart and in some prior art the electrical pulses have been set to sound, but these electrical pulses are not true representations of heart sounds. They are just beeps or other noses that go off when the art pumps. Of course, a stethoscope could be held against one's own chest to listen to the true heart sound during exercise, meditation, or relaxation, but the stethoscope is not hands free and, like with third party listeners, can detract from the soothing and intimate nature of listening to one's own heart sounds.

In view of the foregoing, a need exists for a hands-free heart-beat audio transmitter and receiver system, plus related methods of exercise, meditation and relaxation.

Listening to one's own heart beat can be relaxing. It has been determined that listening to a recording of one's own heart beat can also be relaxing when the recording was taken while in a relaxed state. According to firstbeat.com, higher heart rate variability has been found to be associated with reduced morbidity and mortality, and improved psychological well-being and quality of life. For purposes of this system, heartrate variability is defined as the physiological phenomenon of variation in the time interval between heartbeats, measured by the beat-to-beat interval. In normal healthy situations, heart rate variability increases during relaxing activities (like during meditation or sleep). As expected, heart rate variability decreases when a user is stressed out. Thus, a need further exists for apparatus and related methods of recording and playing back one's own heartbeat, including software for isolating and playing back portions of the recorded heart beat that manifest high heart rate variability.

SUMMARY

Disclosed is a hands-free heart-beat audio transmitter and receiver, plus related methods of meditation and relaxation. In one embodiment, the disclosed system is a device that allows a user to listen to his or her heartbeat wirelessly and hands-free during meditation and relaxation. In a preferred embodiment, a heart-monitor may be placed over the heart with a skin-compatible adhesive. Suitably, the heart monitor may be defined by a microphone and transmitter for picking-up the hearts original sound wave input, converting the original sound wave to an electronic audio signal, transmitting an electrical audio signal wirelessly to Bluetooth® headphones worn by the user. Suitably, the headphones feature a receiver and speaker that translates the audio signal to a digital sound output so that the listener can enjoy the sounds of his or her own beating heart. In another embodiment, the heart monitor includes a recorder and computer memory for storing a digital copy of the electronic audio signal for later transmission and playback of the headphones. In another embodiment, the heart monitor includes an audio jack for wired connection to the headphones.

BRIEF DESCRIPTION OF THE SEVERAL VIEWS OF THE DRAWINGS

Other objectives of the disclosure will become apparent to those skilled in the art once the invention has been shown and described. The manner in which these objectives and other desirable characteristics can be obtained is explained in the following description and attached figures in which.

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Disclosed is a hands-free heart-beat audio transmitter and receiver system, plus related methods of meditation and relaxation. In a preferred embodiment, the system includes a heart monitor and headphones. In one mode of use, the heart monitor is adhered to a user's chest and is configured to pick-up original sound wave inputs from the heart, convert the original wave into an audio signal, and record or transmit wirelessly or wired the audio signal to the headphones. In one mode of use, the headphones are configured to receive the audio signal input from the heart monitor, convert the signal into a digital soundwave output. When used, the system can enable a user to be soothed or comforted by self-intimacy during exercise, relaxation, or meditation. The more specific features of the disclosed system are disclosed in connection with the figures.

Figure 1:
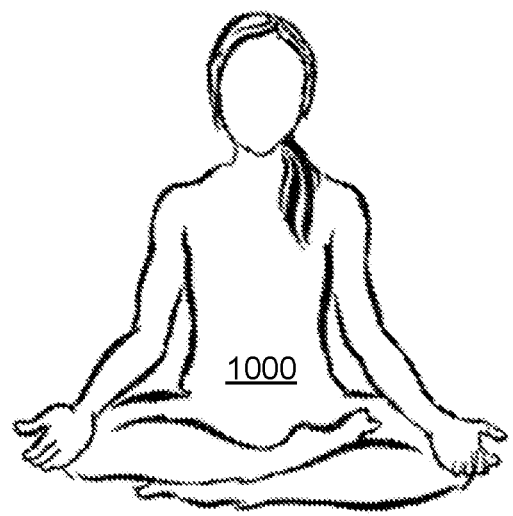
FIG. 1 is a basic view of a user 1000 meditating, relaxing, or exercising.
Figure 2:
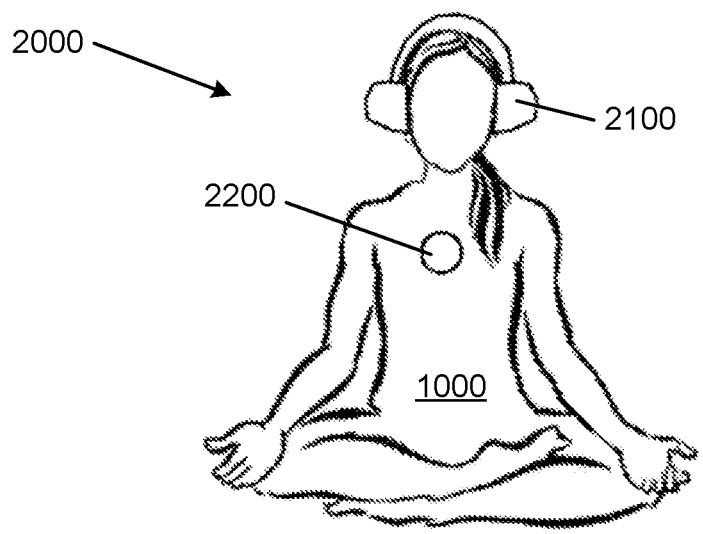
FIG. 2 is a basic view of the user 1000 meditating, relaxing, or exercising with a wireless and hands-free heart-beat audio transmitter and receiver system 2000 in position in the user 1000.

In one embodiment, the disclosed system includes a device that allows a user to listen to his or her heartbeat wirelessly and hands-free during meditation and relaxation. FIG. 1 is a basic view of a user 1000 meditating, relaxing, or exercising. FIG. 2 is a basic view of the user 1000 meditating, relaxing, or exercising with a wireless and hands-free heart-beat audio transmitter and receiver system 2000 in position in the user 1000. The transmitter and receiver system 2000 may be implemented as part of the system 200 of FIG. 2.

Figure 3:
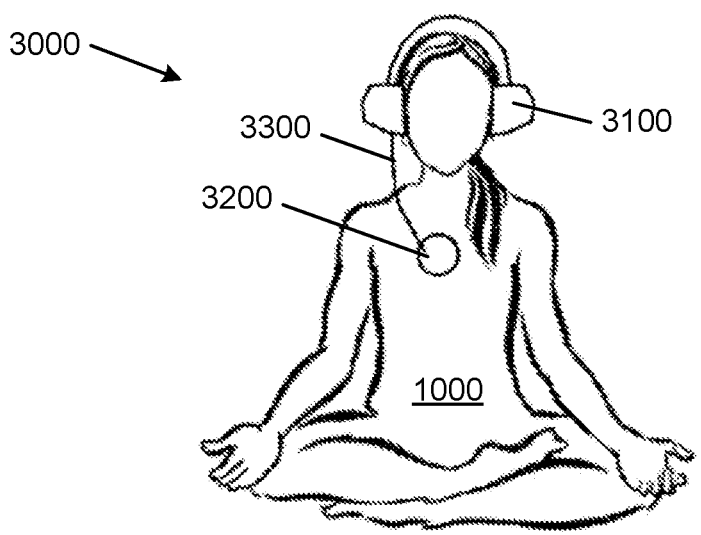
FIG. 3 is a basic view of the user 1000 meditating, relaxing, or exercising with a wired and hands-free heart-beat audio transmitter and receiver system 2000 in position in the user 1000.

FIG. 3 is a basic view of the user 1000 meditating, relaxing, or exercising with a wired and hands-free heart-beat audio transmitter and receiver system 3000 in position in the user 1000. The transmitter and receiver system 3000 may be implemented as part of the system 200 of FIG. 2. In another embodiment, the heart monitor 3200 includes an audio jack 3300 for wired connection to the headphones 3100. Although wired, the system 3000 otherwise operates in accordance with the other disclosed embodiments of the system.

Figure 4:
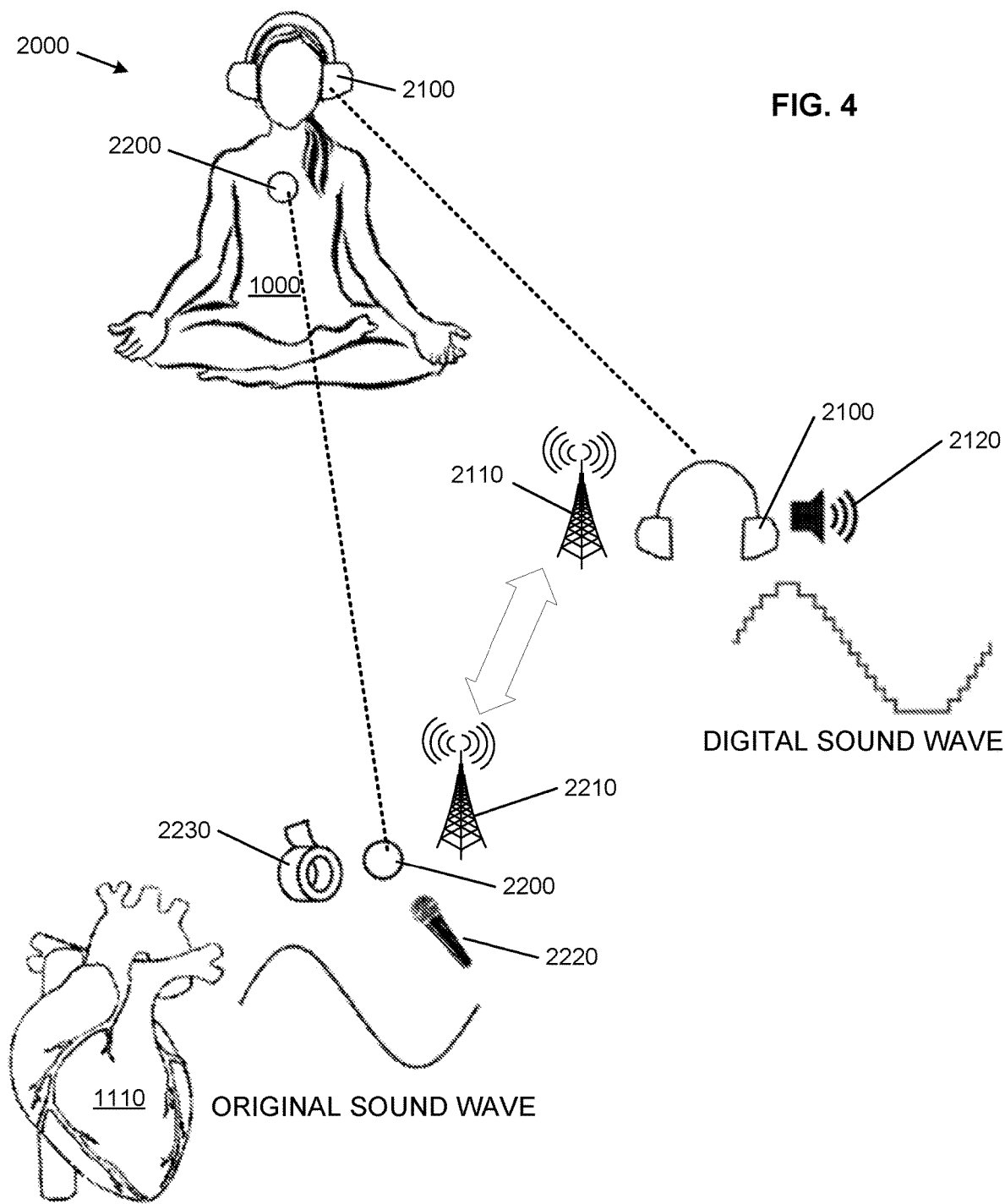
FIG. 4 is a schematic of the disclosed wireless and hands-free heart-beat audio transmitter and receiver system 2000 in position in the user 1000.

FIG. 4 is a schematic of the disclosed wireless and hands-free heart-beat audio transmitter and receiver system 2000 in position in the user 1000. As shown, the system 2000 is defined by a heart monitor 2200 and headphones 2100. The transmitter and receiver system 2000 may be implemented using the system 200 described above in FIG. 2.

Referring to FIG. 4, in a preferred embodiment, a heart-monitor 2200 may placed over the heart with a skin-compatible adhesive 2230 or be otherwise self-adhering to skin, clothing, or other surfaces. Suitably, for the monitor 2200 to adhere to the chest of a user 1000, double sided self-adhesive tape may be used. Often, such tape and adhesive includes silicone, is reusable, and is latex-free. One suitable type of double sided tape can be purchased from Parafix at https://parafix.com/product-groups/double-sided-materials/double-sided-tape/.

Still referring to FIG. 4, suitably, the heart monitor may be defined by a microphone 2220 and transmitter 2210 for picking-up the hearts original sound wave input, converting the original sound wave to an electronic audio signal, transmitting an electrical audio signal wirelessly (e.g., by Bluetooth®) to headphones 2100 worn by the user 1000. In one instance, any one of several commercially available "mini" mics could be incorporated. For instance microphones purchased from Digi-key Electronics here: https://www.digikey.com/product-detail/en/sparkfun-electronics/BOB-12758/1568-1472-ND/6592307?WT.srch=1&gclid=CjOKCQjwzlzWBRDnAR1sAAkc8hHMsZ1BMi9VEwb1EL MOZ19gCL-hEMINckX4SOJ1igo46pac3-V28K4aAjgNEALw_wcB Suitably, the headphones 2100 feature a receiver 2110 and speaker 2120 that translates the audio signal to a digital sound output so that the listener can enjoy the sounds of his or her own beating heart 1110. Any style of commercially available headphones would be suitable for this application.

In another embodiment (not shown), the heart monitor 2200 includes a recorder and computer memory for storing a digital copy of the electronic audio signal for later transmission and playback of the headphones 2100.

As shown in the figures, preferred uses for the system 2000/3000 and/or 200 include, but are not limited to:
1. mediation
2. relaxation
3. during workout—running, yoga, etc.
4. mother to wear for child to hear mother's heartbeat
5. general medical purposes In another embodiment (not shown), the disclosed system need not be adhered to the user's 1000 chest via an adhesive, but may instead be embedded directly in the user's clothing, i.e., their shirt. This embodiment allows for the user 1000 to remove and re-engage the system easily and quickly by simply removing or wearing a shirt with the heartrate monitor 2200 embedded therein. This embodiment is consistent with the principle that the device 2000/3000 is contemplated to operate in a hands-free manner.

In yet another embodiment, the disclosed system may be part of/embedded in a chest strap that could be worn by a user.

Figure 5:
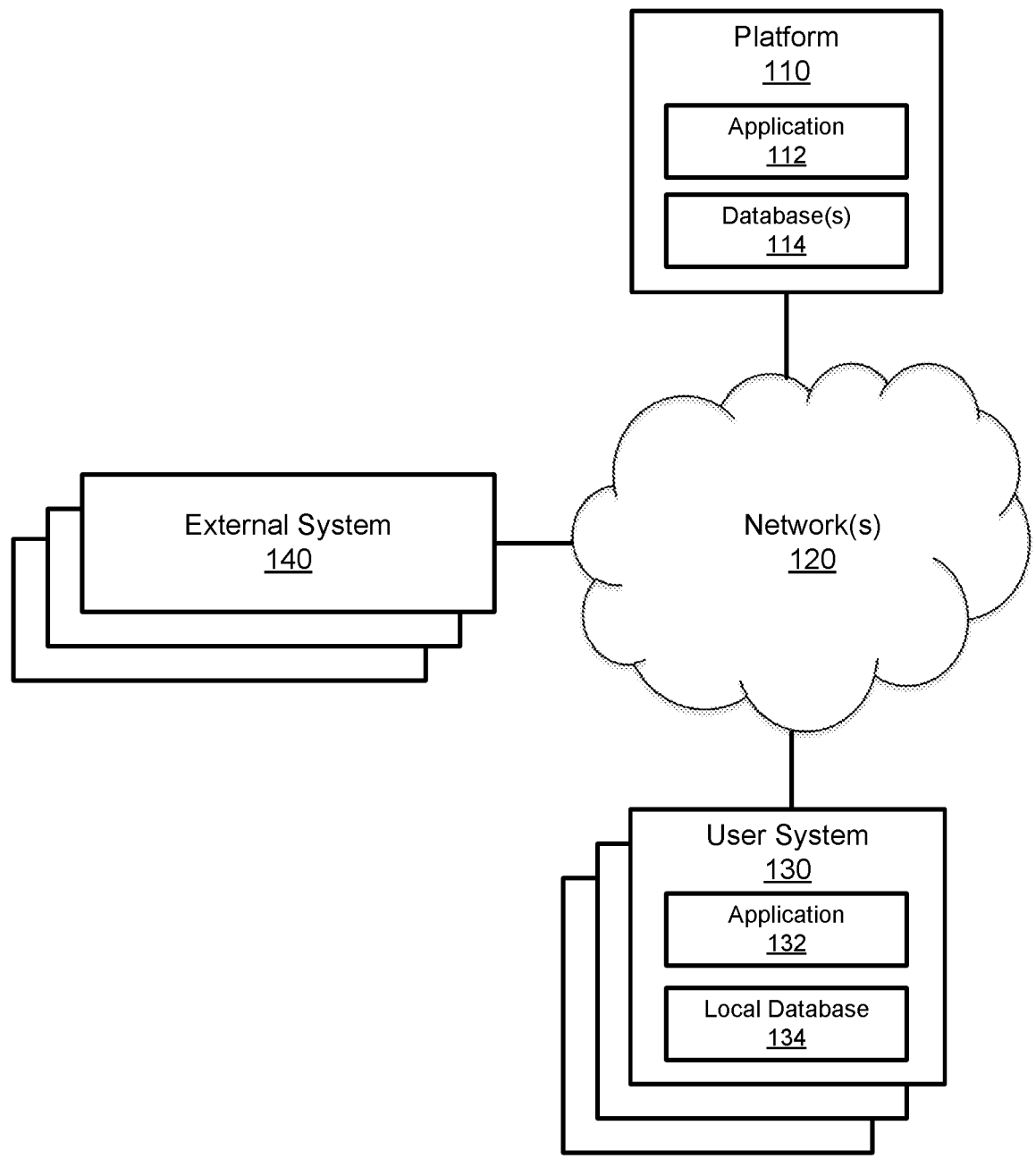
FIG. 5 illustrates an example infrastructure, in which one or more of the processes described herein, may be implemented, according to an embodiment.
Figure 6:
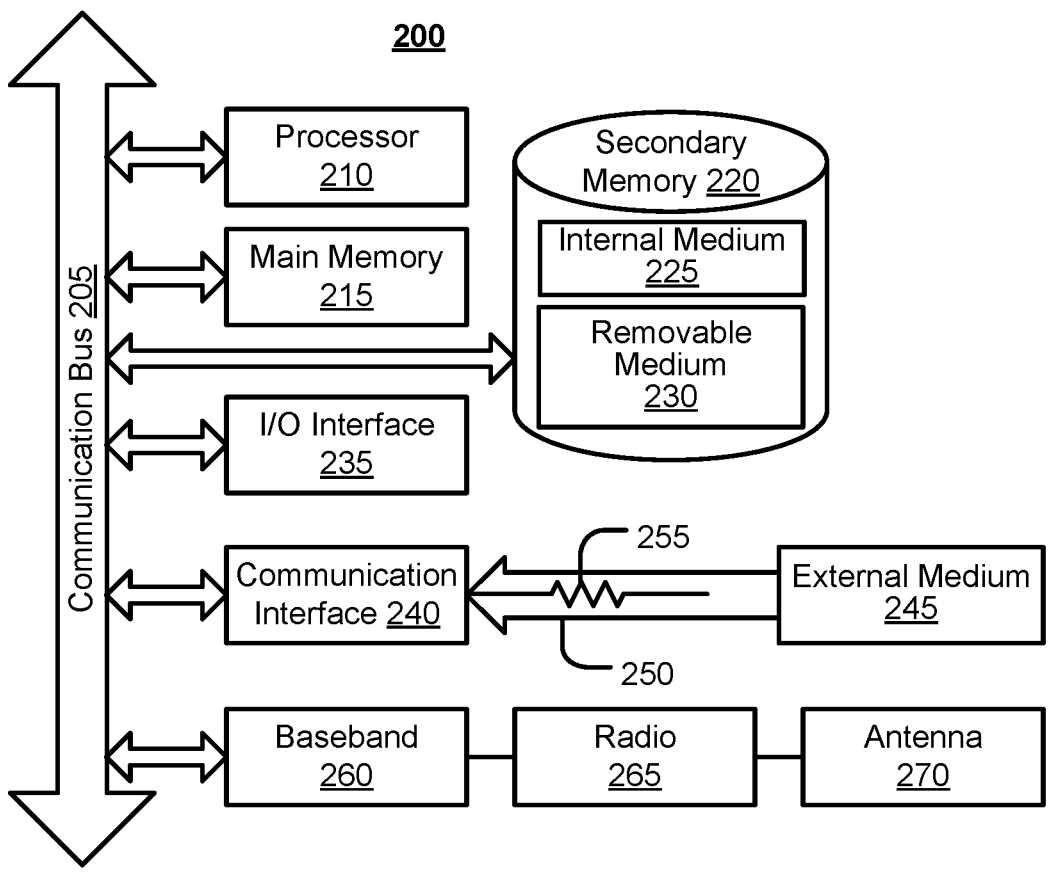
FIG. 6 illustrates an example processing system, by which one or more of the processes described herein, may be executed, according to an embodiment.

In various embodiments, the system 2000/3000 is a wired or wireless system implemented as part of a greater infrastructure. FIG. 5 illustrates an example infrastructure in which one or more of the disclosed processes may be implemented, according to an embodiment. FIG. 6 is a block diagram illustrating an example wired or wireless system 200 that may be used in connection with various embodiments described herein (e.g., system 200 may be used to implement functions/processes described with respect to system 2000/3000).

In one embodiment, the system 2000/3000 optionally includes a software application ("app"), compatible with the user's mobile device or computer. Suitably, the application is configured with code that transfers the output data (e.g., a recorded heart beat) from the transmitter 2210 to a database and stores that data via a computer memory (e.g., a hard drive, SIM card or non-volatile or traditional ram (NVRAM or RAM)). In one embodiment, the software application is implemented as an application 132 of a user system 130 connected to a user device (FIG. 5). In another embodiment, the software application is an application 112 of an online/external platform 110 that is communicatively connected to the user system 2000/3000. In yet another embodiment, the software application is partially implemented in a user system 130 and partially implemented in an external platform 110.

In a preferred embodiment, a software application 112/132 may be configured to quantify the recorded heart beat into heart rate data (e.g., beats per minute or heart rate variability) and graphically display said data (e.g., using user system 130). Preferably, the user may view characteristics of their heartbeat and accompanying data during the recorded time period, said characteristics including but not limited to: heartrate variability over time, maximum heartrate, minimum heartrate, average heartrate, and the periods of time during which the user was most and least at rest. In one embodiment, the software application 112/132 is configured to store (e.g., in a local user device database) and/or transfer recorded data as digital files. For example, data may be initially stored in a database and later retrieved from the database and sent to a user via text message or email. In another example, data may be immediately transferred to an external device, for example, the software application 112/132 may transfer (e.g., via network 120) a recorded heartbeat and/or heart rate data to an external system 140.

In one preferred embodiment, the software application 112/132 is further configured for playback of the recorded heart beat sounds or a portion of the recorded heart beat sounds. In particular, a preferred embodiment of the application isolates portions of the recorded heart beat that manifest a high heart rate variability and plays-back, on demand, this portion of the user's heart beat to the user. Suitably, the application also permits the user to select a time range from a given stored recording and to play back to the user or a third party through an amplification means, such as headphones 2100 or a speaker system 2120, the original analog soundwave or the converted digital version recorded during the chosen time range. The application likewise allows the user or a third party-such as a mother's child-to listen to the user's heartbeat via the amplification means in real time and to monitor the data as it is collected and/or stored in real time. Additionally, the application can be configured to display graphically the aforementioned heart-rate data characteristics in real time as they are recorded.

In one embodiment, the application 112/132 additionally comprises an integrated auditory supplement function. The function permits the user to play a secondary audio file and either in real time or previously recorded heartbeat simultaneously via the same amplification means. One example of a secondary audio file the user may select is a voice-guided meditation. Another example of a secondary audio file is a user-recorded file (e.g., their own voice, sound, music, etc.). By overlaying the secondary audio file (e.g., voice-guided meditation) on the real time heartbeat audio, the user may enjoy a guided meditation and monitor their heartrate as to ensure optimal results. In one embodiment, the software application 132 is configured enable a user to customize sound levels for the heartbeat audio and secondary audio file overlay.

In one embodiment, the secondary audio file may be received by the software application 132 of a user device and overlaid with the heartbeat in real time. For example, the secondary audio file may be a real-time guided meditation streamed (e.g., via network 120) to a user device from an online platform 110 or an external system 140. In one embodiment, the software application 132 local to the user system 2000/3000 is configured to access a library of secondary audio files locally stored on the user system (e.g., within local database 134). In another embodiment, the online platform 110 additionally/alternatively includes a library of secondary audio files (e.g., guided meditations or other audio files such as nature sounds, etc.) that may be streamed to a user and combined/overlaid with the heartbeat sound via the software application 112/132. Additionally or alternatively, secondary audio files may be streamed from external systems 140 (e.g., $3^{rd}$ party meditation studios) to the user device system 2000/3000 in real time.

In one embodiment, the online platform 110 facilitates the streaming of a secondary audio file from the external system 140 to the user device. In various examples, secondary audio file may be one or more of: guided meditations, nature sounds, music or sounds within a specific frequency range, etc. In one embodiment, the software application enables a user to modify/select a frequency of sound (Hz) for their pre-recorded or real time secondary audio file.

In one embodiment, the software application 112/132 is configured to create a binaural beat effect by playing two audio sources (e.g., the secondary audio and the heartbeat sound) separately in two different earbuds or speakers so that, for example, a user could listen to their heartbeat (recorded or real-time) in one ear and the selected secondary audio file (e.g., recorded or real-time guided meditation or sound waves) in the other ear.

In one embodiment, the software application 112/132 is configured to enable a user to customize sound levels for the overlaid audio track such that, for example, the heartbeat audio is selected to have a first sound level and the secondary audio is selected to have a second sound level. In one embodiment, the software application 112/132 is configured to enable a user to select a fadeaway feature for the heartbeat audio, so that the heartbeat sound gradually decreases over a specified period of time set by the user. In one embodiment, the fadeaway feature may be applied to the combined/overlaid heartbeat and secondary audio (i.e., the overlaid audio track). In another embodiment, the fadeaway feature may be applied to one of the sources of the overlaid audio track, so that, for example, the sound of a guided meditation decreases over a specified period of time while the heartbeat sound volume stays constant. In another embodiment, the fadeaway feature may be applied to the different sources of the overlaid track using different parameters (e.g., both source sounds decrease over time, but at different rates/different specified periods of time).

In one embodiment, the software application 112/132 may create an overlaid audio file by combining/overlaying more than two audio sources (the heartbeat audio and the secondary audio). For example, two heartbeat audio tracks may be overlaid with one secondary audio track or one heartbeat audio may be overlaid with two or more secondary audio tracks. The overlaid audio track using three or more sources may be used in conjunction with various embodiments described herein with respect to the overlaid audio track that uses two sources.

In one embodiment, the software application 112/132 is configured to isolate and extract the sound of the heartbeat when the heartbeat is determined to be within a specific heartbeat range (e.g., lowest beats per minute). For example, the system 2000/3000 may record a user's heartbeat for five hours and then isolate/extract the heartbeat audio segments in which the heartbeat was determined to be at 50 beats per minute or at 50 beat/minute or lower. The extracted/isolated segments may be stored or transmitted as a single heartbeat audio or as separate heartbeat audio files, which may be used according to various embodiments described herein.

In one embodiment, the software application 112/132 is configured to loop one or more heartbeat audio files. For example, if only a few minutes of a heartbeat were captured or isolated, the software application 112/132 can seamlessly and continuously loop those few minutes for a predesignated period of time. In one embodiment, the software application 112/132 is configured to stitch/loop the heartbeat audio such that the audio seam is imperceptible to the human ear (e.g., match the heartbeats at the seams of the audio).

In one embodiment, the software application 112/132 is configured to provide visual elements to the user via a user device, for example, guided visuals for breathing may be displayed on a user device via user system 130. In one embodiment, the software application 112/132 may be configured to combine the visual elements with the secondary audio file (e.g., overlay the heartbeat audio and secondary audio file and simultaneously display guided breathing video/images).

In one embodiment, the user system 2000/3000 may be connected in real time, via software application 112/132, to other users. In one embodiment, the platform 110 may be configured to simultaneously connect multiple users to, for example, a streaming or recorded secondary audio. For example, the platform 110 may be used to create meditation "rooms" where users can invite other users and/or listen to guided meditations (third-party or provided by platform 110) in real time (with or without the wearable device and heartbeat sound overlay). In one embodiment, the platform 110 may be used to connect multiple users to one another without a secondary audio. In one embodiment, the platform 110 may be configured to enable one user to listen to another user's heartbeat in real time. For example, within a guided meditation room, a user may listen to an overlaid audio of another user's real-time heartbeat and a guided meditation audio. In another example, a user may listen to an overlaid audio of their own and someone else's heartbeats.

In one embodiment, the application 112/132 is further configured to gather and store data pertaining to other heart measurements, for example, heartrate and heart rate variability (HRV). In one embodiment, the application is also configured to graphically display heartrate and HRV (and other heart measurement data) changes over time.

In one embodiment, the application 112/132 is configured to provide a user heartbeat listening and meditation reminders/notifications. The application can also notify the user if they are out of a predetermined heart measurement range (e.g., have an elevated heart rate).

In one exemplary embodiment, the software application 112/132 is configured to perform one or more its functions simultaneously with other software applications running on the user's mobile device or computer. In other words, the software application 112/132 may perform one or more of its functions (e.g., generating an audio file, obtaining heartbeat audio, transmitting audio to speakers, etc.) while another software application (e.g., a music or video playing application, a game application, a news/reading application, etc.) is open in the background, foreground, or alongside the software application 112/132 of the present disclosure. For example, a user may be able to listen to music via a different application (e.g., YouTube, Spotify, etc.) while simultaneously listening to a heartbeat audio via the software application 112/132. In one embodiment, the ability of the software application 112/132 to run simultaneously with other applications may be selected/turned on via an application 112/132 or user mobile device setting.

FIG. 5 illustrates an example infrastructure in which one or more of the disclosed processes may be implemented, according to an embodiment. The infrastructure may comprise a platform 110, e.g., one or more servers, which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140, e.g., other platforms, websites, etc., via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. Each user system 130 may comprise or be communicatively connected to a client application 132 and/or one or more local databases 134.

Platform 110 may comprise web servers which host one or more websites and/or web services. In embodiments in which a website is provided, the website may comprise a graphical user interface, including, for example, one or more screens, e.g., webpages, generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols, e.g., HTTP, HTTPS, etc. These screens, e.g., webpages, may comprise a combination of content and elements, such as text, images, videos, animations, references, e.g., hyperlinks), frames, inputs, e.g., textboxes, text areas, checkboxes, radio buttons, drop-down menus, buttons, forms, etc., scripts, e.g., JavaScript, and the like, including elements comprising or derived from data stored in one or more databases, e.g., database(s) 114, that are locally and/or remotely accessible to platform 110. Platform 110 may also respond to other requests from user system(s) 130.

Platform 110 may comprise, be communicatively coupled with, or otherwise have access to one or more database(s) 114. For example, platform 110 may comprise one or more database servers which manage one or more databases 114. Server application 112 executing on platform 110 and/or client application 132 executing on user system 130 may submit data, e.g., user data, form data, etc., to be stored in database(s) 114, and/or request access to data stored in database(s) 114. Any suitable database may be utilized, including without limitation My SQL™, Oracle™ IBM™, Microsoft SQL™, Access™, PostgreSQL™, MongoDB™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module, e.g., comprised in server application 112, executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132, executing on one or more user system(s) 130, may interact with a server application 112 executing on platform 110 to execute one or more or a portion of one or more of the various functions, processes, methods, and/or software modules described herein. In an embodiment, client application 132 may utilize a local database 134 for storing data locally on user system 130.

Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the software described herein, which may wholly reside on either platform 110, e.g., in which case server application 112 performs all processing, or user system(s) 130, e.g., in which case client application 132 performs all processing, or be distributed between platform 110 and user system(s) 130, e.g., in which case server application 112 and client application 132 both perform processing, can comprise one or more executable software modules comprising instructions that implement one or more of the processes, methods, or functions described herein.

FIG. 6 is a block diagram illustrating an example wired or wireless system 200 that may be used in connection with various embodiments described herein (e.g., the system 2000/3000 may be implemented as the wired or wireless system 200). For example, system 200 may be used as or in conjunction with one or more of the functions, processes, or methods, e.g., to store and/or execute the software, described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms, e.g., digital-signal processor, a slave processor subordinate to the main processing system, e.g., back-end processor, an additional microprocessor or controller for dual or multiple processor systems, and/or a coprocessor. Such auxiliary processors may be discrete processors or may be integrated with processor 210. Examples of processors which may be used with system 200 include, without limitation, any of the processors, e.g., Pentium™, Core i7™, Xeon™, etc., available from Intel Corporation of Santa Clara, California, any of the processors available from Advanced Micro Devices, Incorporated (AMD) of Santa Clara, California, any of the processors, e.g., A series, M series, etc., available from Apple Inc. of Cupertino, any of the processors, e.g., Exynos™, available from Samsung Electronics Co., Ltd., of Seoul, South Korea, any of the processors available from NXP Semiconductors N.V. of Eindhoven, Netherlands, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code, e.g., any of the software disclosed herein, and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 include an external hard disk drive, an external optical drive, an external magneto-optical drive, and/or the like.

As mentioned above, system 200 may include a communication interface 240. Communication interface 240 allows software and data to be transferred between system 200 and external devices, e.g. printers, networks, or other information sources. For example, computer software or executable code may be transferred to system 200 from a network server, e.g., platform 110, via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network, e.g., network(s) 120, or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network, e.g., network(s) 120, or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code, e.g., computer programs, such as the disclosed software, is stored in main memory 215 and/or secondary memory 220. Computer-executable code can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225 and/or removable medium 230), external storage medium 245, and any peripheral device communicatively coupled with communication interface 240 (including a network information server or other network device). These non-transitory computer-readable media are means for providing software and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display, e.g., in a smartphone, tablet, or other mobile device.

System 200 may also include optional wireless communication components that facilitate wireless communication over a voice network and/or a data network, e.g., in the case of user system 130. The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor(s) 210. Processor(s) 210 may have access to data storage areas 215 and 220. Processor(s) 210 are preferably configured to execute instructions, i.e., computer programs, such as the disclosed software) that can be stored in main memory 215 or secondary memory 220. Computer programs can also be received from baseband processor 260 and stored in main memory 210 or in secondary memory 220, or executed upon receipt. Such computer programs, when executed, can enable system 200 to perform the various functions of the disclosed embodiments.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional" "traditional" "normal" "standard" "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

What is claimed:

1. A system comprising:
 a database having a plurality of pre-recorded audio files stored thereon;
 a heart monitor having a microphone, configured to pick-up a heartbeat sound wave and convert the heartbeat sound wave to a first heartbeat audio, and a transmitter, configured to transmit the first heartbeat audio;

headphones having a receiver, configured to receive the first heartbeat audio from the transmitter, and a speaker configured to play the first heartbeat audio for a first user; and a software application configured to (i) determine a heart rate variability of the first user from the first heartbeat audio (ii) isolate portions of the first heartbeat audio associated with increased heart rate variability, (iii) generate an overlaid audio by overlaying a first audio file of the plurality of pre-recorded audio files onto the isolated portions of the first heartbeat audio associated with increased heart rate variability, (iv) transmit the overlaid audio to the receiver, and (v) play the overlaid audio using the speaker while the first user is meditating, relaxing, or working out.

2. The system of claim 1, wherein the first audio file comprises a guided meditation.

3. The system of claim 1, wherein the first audio file comprises a voice audio file recorded by the first user.

4. The system of claim 1, wherein the overlaid audio comprises a second heartbeat audio, wherein the second heartbeat audio is associated with a second user.

5. The system of claim 1, wherein the first audio file comprises sound within a range of sound frequencies, and wherein the software application is further configured to enable the first user to select the range of sound frequencies.

6. The system of claim 1, wherein the speaker includes a first speaker and a second speaker, and wherein the software application is configured to play the overlaid audio by simultaneously playing the first heartbeat audio from the first speaker and playing the first audio file from the second speaker.

7. The system of claim 6, wherein the first and second speakers comprise first and second earbuds, respectively.

8. The system of claim 1, wherein the software application is further configured to determine that one or more portions of the first heartbeat audio contain heartbeat audio within a predetermined heartrate range, and extract the one or more portions of the first heartbeat audio.

9. The system of claim 8, wherein the software application is further configured to use the extracted one or more portions of the first heartbeat audio to generate the overlaid audio.

10. The system of claim 1, wherein the first heartbeat audio comprises an audio segment, and wherein the software application is configured to generate a looped heartbeat audio using the audio segment.

11. The system of claim 1, wherein the software application is further configured to enable the first user to customize sound levels for the overlaid audio.

12. The system of claim 11, wherein enabling the first user to customize the sound levels comprises enabling the first user to select a fadeaway time duration for one or more of: the first heartbeat audio, the first audio file, and the overlaid audio.

13. A system comprising:
a wireless communication network;
a first heart monitor having a microphone configured to pick-up a heartbeat sound wave of a first user and convert the heartbeat sound wave to a first heartbeat audio file;
a first speaker communicatively connected to the first heart monitor; and
a software application communicatively connected to the first heart monitor, the first speaker, and the wireless communication network, the software application configured to (i) determine a heart rate variability of the first user from the first heartbeat audio file, (ii) isolate portions of the first heartbeat audio file associated with increased heart rate variability, (iii) obtain a secondary audio file, (iv) generate a first overlaid audio by overlaying the isolated portions of the first heartbeat audio file associated with increased heart rate variability and the secondary audio file, (v) play the first overlaid audio using the first speaker.

14. The system of claim 13, wherein obtaining the secondary audio file comprises receiving the secondary audio file from an external source via the wireless communication network.

15. The system of claim 14, wherein obtaining the secondary audio file and generating the first overlaid audio comprises streaming the secondary audio file from the external source and the first heartbeat audio file in real time.

16. The system of claim 14, wherein the secondary audio file comprises a guided meditation.

17. The system of claim 14, wherein the first speaker is associated with a second user and wherein the first speaker is communicatively connected to the first heart monitor via the wireless communication network.

18. The system of claim 14, further comprising: a second heart monitor associated with a second user and configured to obtain a second heartbeat audio file, and a second speaker associated with the second user, wherein the first heart monitor and the first speaker are associated with the first user, and wherein the software application is further configured to:
generate a second overlaid audio by overlaying the second heartbeat audio file with the secondary audio file; and
play the second overlaid audio using the second speaker while playing the first overlaid audio using the first speaker.

19. A system comprising:
a database having a pre-recorded audio signal stored thereon;
a heart monitor with a microphone, configured to pick-up a heartbeat sound wave and convert the original sound wave to an electronic audio signal and a transmitter, configured to transmit the electrical audio signal;
headphones with a receiver and speaker, configured to receive the transmitted electronic audio signal and replay the electronic audio signal for a user, while the user is meditating, relaxing, or working out after (i) the heartbeat sound wave is picked-up and then converted to the electronic audio signal by the microphone, (ii) the electronic audio signal is transmitted to the receiver of the headphones via the transmitter, and (iii) the electronic audio signal is converted back into a soundwave by the speaker; and
a software application configured to (i) determine a heart rate variability of the user from the electronic audio signal, (ii) isolate portions of the electronic audio signal associated with increased heartrate variability by identifying segments of the electronic audio signal where the heart rate variability exceeds a threshold value, (iii) generate an overlaid audio signal by overlaying the pre-recorded audio signal onto the isolated portions of the electronic audio signal associated with increased heart rate variability and (iv) transmit the overlaid audio signal to the user while the user is meditating, relaxing, or working out.

20. The system of claim 19, wherein the pre-recorded audio signal comprises one or a combination of: a guided meditation, music, and nature sounds.

* * * * *